United States Patent
Yamamoto

(10) Patent No.: US 7,260,091 B2
(45) Date of Patent: Aug. 21, 2007

(54) TRANSMISSION EQUIPMENT HAVING A PACKET SWITCHING FUNCTION

(75) Inventor: Kanta Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 984 days.

(21) Appl. No.: 10/087,062

(22) Filed: Mar. 1, 2002

(65) Prior Publication Data

US 2003/0058897 A1    Mar. 27, 2003

(30) Foreign Application Priority Data

Sep. 26, 2001   (JP)   ............... 2001-294375

(51) Int. Cl.
*H04L 12/50*    (2006.01)

(52) U.S. Cl. .................................................. 370/357

(58) Field of Classification Search ........ 370/351–357, 370/359, 360, 380, 389, 390, 392
See application file for complete search history.

(56) References Cited

U.S. PATENT DOCUMENTS

| | | | | |
|---|---|---|---|---|
| 5,124,978 A | * | 6/1992 | Chao | ............... 370/422 |
| 5,365,518 A | * | 11/1994 | Noser | ............... 370/535 |
| 6,587,470 B1 | * | 7/2003 | Elliot et al. | ............... 370/404 |
| 6,621,828 B1 | * | 9/2003 | Field et al. | ............... 370/466 |
| 6,701,088 B1 | * | 3/2004 | Watanabe et al. | ............... 398/51 |
| 7,031,324 B1 | * | 4/2006 | Goody | ............... 370/401 |
| 2002/0075819 A1 | * | 6/2002 | Kumar et al. | ............... 370/294 |

FOREIGN PATENT DOCUMENTS

EP    1 076 468 A2    2/2001

\* cited by examiner

*Primary Examiner*—Dmitry Levitan
(74) *Attorney, Agent, or Firm*—Katten Muchin Rosenman LLP

(57) ABSTRACT

Efficient packet traffic transmission equipment is provided by enhancing the transmission equipment already implemented in a carrier to have the packet processing function, with a reduced number of cross-connects for 1:n (point-to-multipoint) connection between nodes. Transmission equipment includes a switch board having a cross-connect portion for making a multiplexed packet signal to branch to predetermined paths; and a plurality of interface boards for interfacing the cross-connect portion with a multiplexed signal being transmitted on a path, wherein at least one of the plurality of interface boards is a dedicated interface board having a path switch function of demultiplexing the multiplexed packet signal to each packet to route the demultiplexed packet signal to a predetermined path.

5 Claims, 10 Drawing Sheets

Add/Drop

TRANSMISSION EQUIPMENT HAVING A PACKET SWITCHING FUNCTION

FIELD OF THE INVENTION

The present invention relates to transmission equipment having conventional transmission equipment architecture enabling a novel packet switch facility and, more particularly, transmission equipment having a packet switching (routing) function conforming to the IP (Internet Protocol), ATM (Asynchronous Trans fer Mode), Frame Relay, etc.

BACKGROUND OF THE INVENTION

Conventionally, transmission equipment has been introduced in communication carriers for transmitting TDM (time-division multiplex) channel signals. In recent years, however, mainstream of the traffic data carried by communication systems has been shifted to data having a packet format.

Today there is one type of such a network, as shown in FIG. 1, in which an IP packet is routed by a router or aggregator 201 or the like in an ISP (internet service provider) 200. Long-haul transmission of such a packet is then carried out using transmission equipment 101 provided by a communication carrier 100.

Here, packet signals multiplexed into STS-n (n=1/3/12/48) are transmitted in a long distance through transmission equipment 101 provided in carrier 100. The signals are conveyed through a predetermined path (or a physical channel) dedicatedly connected one-to-one (point-to-point) by a cross-connect portion (routing means). In such a manner, packet traffic is conveyed through a TDM channel without need of distinguishing the information unit, 'packet'.

However, when 1-to-n (i.e. point-to-multipoint) connection is desired for packet traffic, there are required extremely large number of cross-connect lines so far as the above-mentioned type of transmission is employed. In order to meet such traffic requirement, transmission equipment of this type is not economically advantageous.

One method introduced in earner 100 to cope with the aforementioned problem is shown in FIG. 2. IP traffic 300 is terminated and then is lead to an aggregator router 102, which are additionally provided and in which traffic signals are concentrated or routed on a packet-by-packet basis, so that the number of connection lines for 1-to-n (point-or-multipoint) connection between the nodes can be decreased.

To implement the above-mentioned method, however, it is necessary for carrier 100 newly to introduce aggregator or router 102. This necessitates additional capital investment, reservation of installation space, and measures to cope with the difference of maintenance method.

SUMMARY OF THE INVENTION

Accordingly, it is an object of the present invention to provide transmission equipment already installed in a carrier with a packet processing function to attach thereto, so that the number of cross-connect lines required for 1-to-n (point-to-multipoint) connection can be reduced.

It is another object of the present invention to provide transmission equipment enabling efficient transmission of packet traffic without requiring extra preparation of hardware such as an aggregator/router and a different maintenance method.

As a first aspect of the transmission equipment according to the present invention to solve the aforementioned problem, the transmission equipment includes; a switch board having a cross-connect portion for making a multiplexed packet signal to branch to predetermined paths; and a plurality of interface boards for interfacing the cross-connect portion with a multiplexed signal being transmitted on a path. At least one of the plurality of interface boards is a dedicated interface board having a path switch function of demultiplexing the multiplexed packet signal to each packet to route the demultiplexed packet signal to a predetermined path.

As a second aspect of the transmission equipment according to the present invention to solve the aforementioned problem, in the transmission equipment according to the above-mentioned first aspect, the switch board and the plurality of interface boards are respectively inserted to slots mounted on a shelf frame so as to interconnect mutually through a backboard provided on the shelf frame.

As a third aspect of the transmission equipment according to the present invention to solve the aforementioned problem, in the above-mentioned first aspect, the packet conforms to either IP (Internet Protocol), ATM (Asynchronous Transfer Mode) or Frame Relay.

As a fourth aspect of the transmission equipment according to the present invention to solve the aforementioned problem, the transmission equipment according to the above-mentioned first aspect includes a plurality of the dedicated interface boards each having a path switch function of demultiplexing the multiplexed packet signal to each packet to route the demultiplexed packet signal to a predetermined path. Each of the plurality of dedicated interface boards includes an extension interface so that a packet to be directed to a path accommodated in the self interface board is routed to a predetermined path in the self interface board, and that a packet to be directed to a path not accommodated in the self interface board is routed to the other dedicated interface board accommodating the path concerned.

As a fifth aspect of the transmission equipment according to the present invention to solve the aforementioned problem, in the transmission equipment the above-mentioned first aspect, the dedicated interface board having the path switch function of routing the demultiplexed packet signal to a predetermined path is redundant in configuration having a working side and a protection side, to transfer an identical signal to both the working side and the protection side of the interface board when a multiplexed signal is transferred from the interface board to the dedicated interface board having the path switch function, using a 1:2 connection produced by a cross-connect portion in the switch board.

As a sixth aspect of the transmission equipment according to the present invention to solve the aforementioned problem, in the transmission equipment according to the above-mentioned fifth aspect, a packet signal from either the working side or the protection side of the dedicated interface board, to be transferred to the switch board through the cross-connect portion, is selected by a 2:1 selector in the path switch function of the switch board.

Further scopes and features of the present invention will become more apparent by the following description of the embodiment with the accompanied drawings.

DETAILED DESCRIPTION OF THE PREFERRED EMBODIMENTS

The preferred embodiments of the present invention are described hereinafter referring to the charts and drawings, wherein like numerals or symbols refer to like parts.

Figure 1:
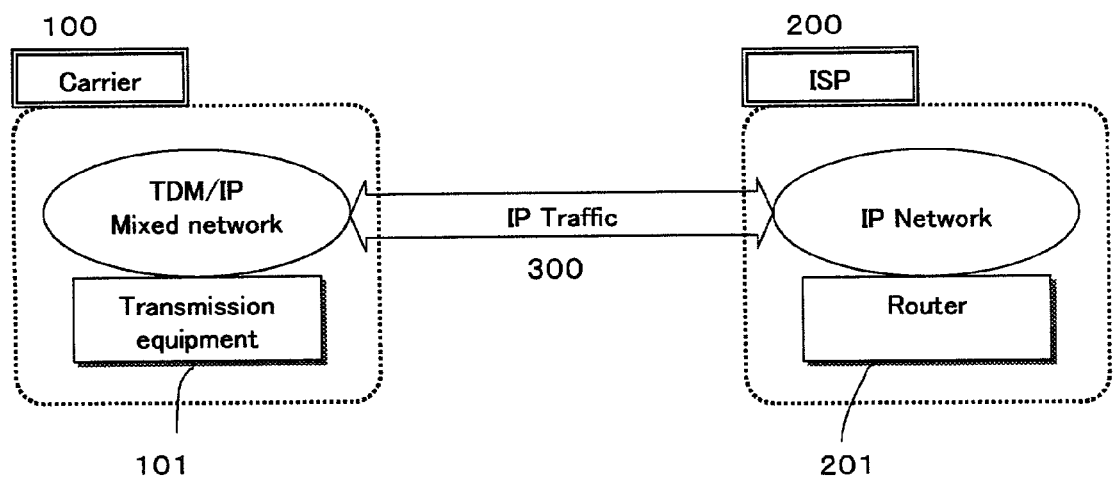
FIG. 1 shows an exemplary network configuration of a carrier network.
Figure 2:
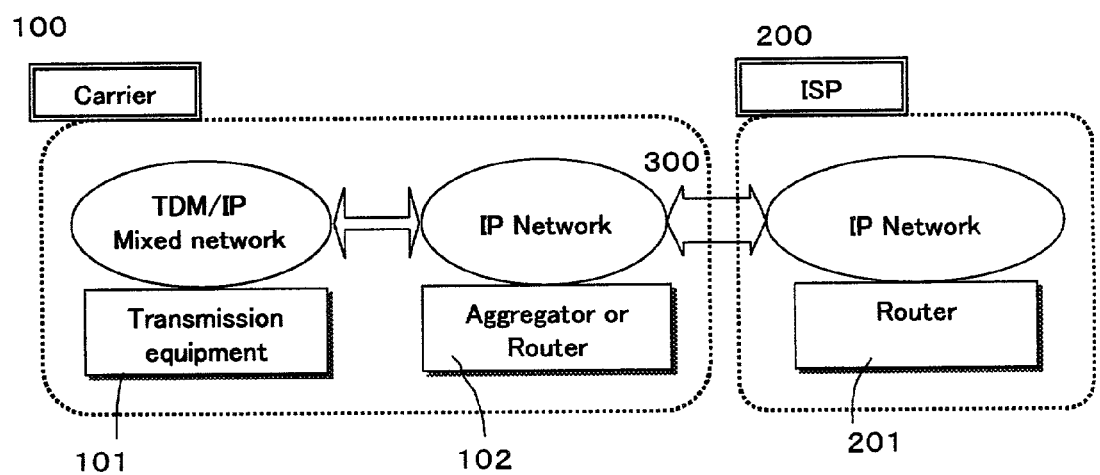
FIG. 2 shows another exemplary network configuration of a carrier network.
Figure 3:
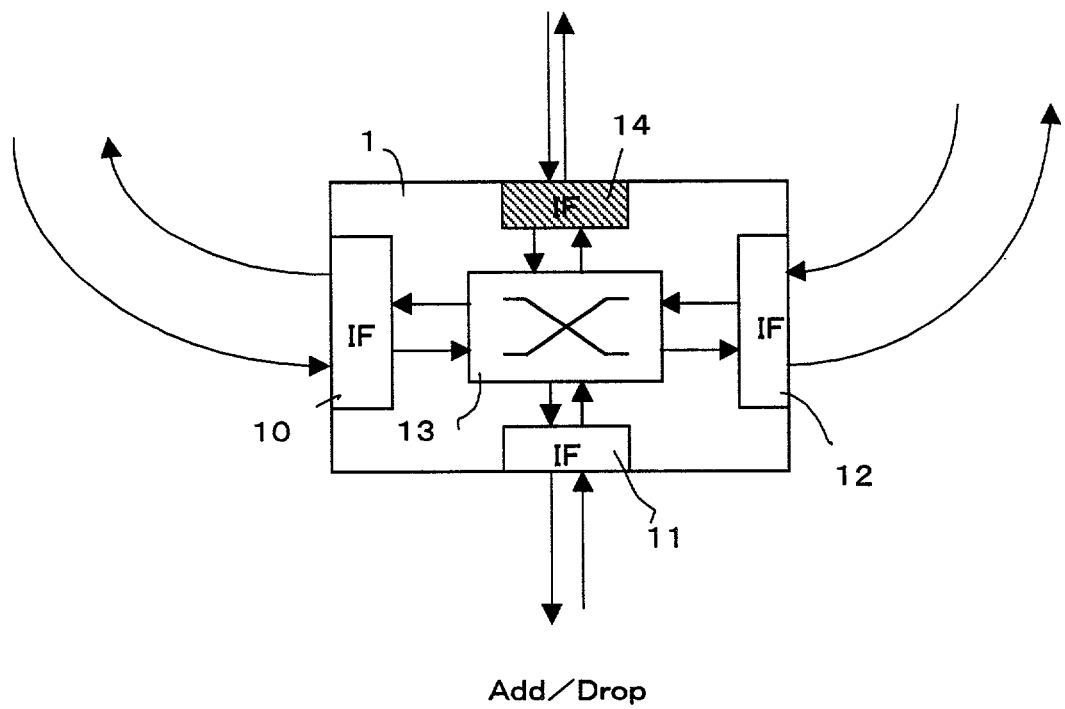
FIG. 3 shows a general diagram of SONET (Synchronous Optical Network)/SDH (Synchronous Digital Hierarchy) transmission equipment for illustrating the concept of the present invention.

In FIG. 3, there is shown a schematic diagram of SONET (Synchronous Optical Network)/SDH (Synchronous Digital Hierarchy) transmission equipment for the explanation of the present invention. Typical SONET/SDH transmission equipment 1 shown in this figure includes interface boards 10, 11, 12 accommodating either optical or electrical line interfaces, and an STS switch (STS-SW) board 13 accommodating a cross-connect portion.

In such typical configuration of SONET/SDH transmission equipment 1, data are received or transmitted from/to a path established by a cross-connect portion of STS-SW board 13 on a per multiplexed signal basis of STS-n (n=1/3/12/48).

On the other hand, as a feature of the present invention, there is provided an interface board 14 (hereinafter referred to as a service card) having a packet switch function for switching a path on a packet basis. Service card 14 can be substituted for an existing interface board, or otherwise newly mounted by inserting to a connector originally provided for an ordinary interface board.

Figure 4:
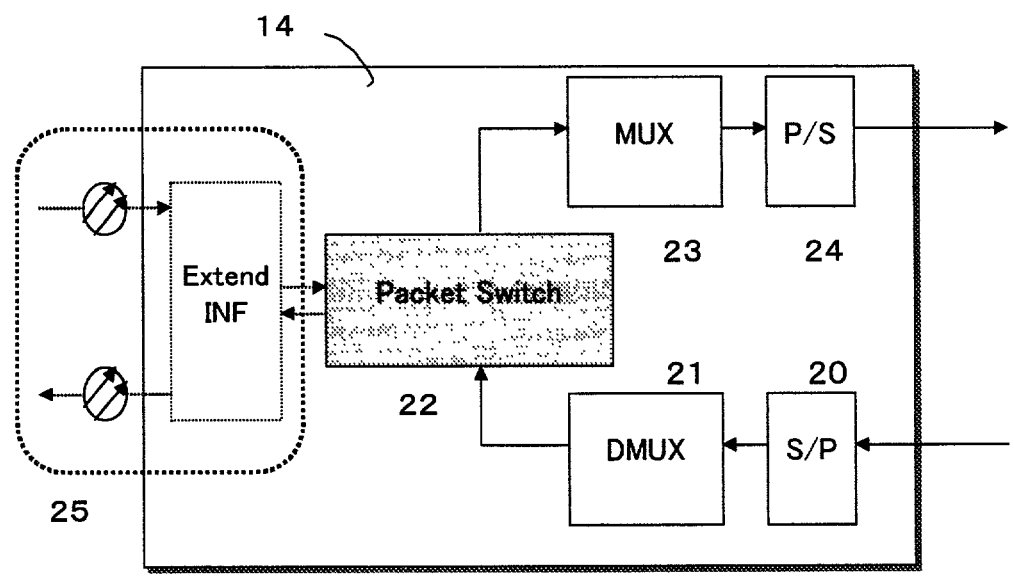
FIG. 4 shows details of a service card.

FIG. 4 shows a diagram illustrating detail of such a service card 14. In FIG. 4, a multiplexed packet branching from STS-SW board 13 is converted into a parallel signal by a serial-to-parallel converter 20 to demultiplex into individual packets by a demultiplexer 21.

Then, the packet is transferred on a predetermined path by a packet switch 22 to output to multiplexer 23 or an extension interface 25 to connect to another service card (not shown). Here, extension interface 25 is prepared to increase the switch capacity.

Therefore, packet switch 22 shown in FIG. 4 is also capable of receiving a packer output from another packet switch provided in another service card, which is not shown in FIG. 4.

In packet switch 22, a path is switched to output to multiplexer 23 either a packet being input from demultiplexer 21 or a packet being input from any other service card through extension interface 25. The packet multiplexed by multiplexer 23 is transferred to STS-SW board 13 through a parallel-to-serial converter 24.

In such a manner, according to the present invention, a path can be switched on a packet basis using service card 14. This enables to reduce the number of cross-connect lines in STS-SW 13 even in case 1:n (point-to-multipoint) connection is required.

Moreover, service card 14 is configured to have a physical compatibility with an existing interface board. Therefore, the function intended by the present invention can easily be implemented by mounting service card 14 onto transmission equipment already in operation.

Figure 5:
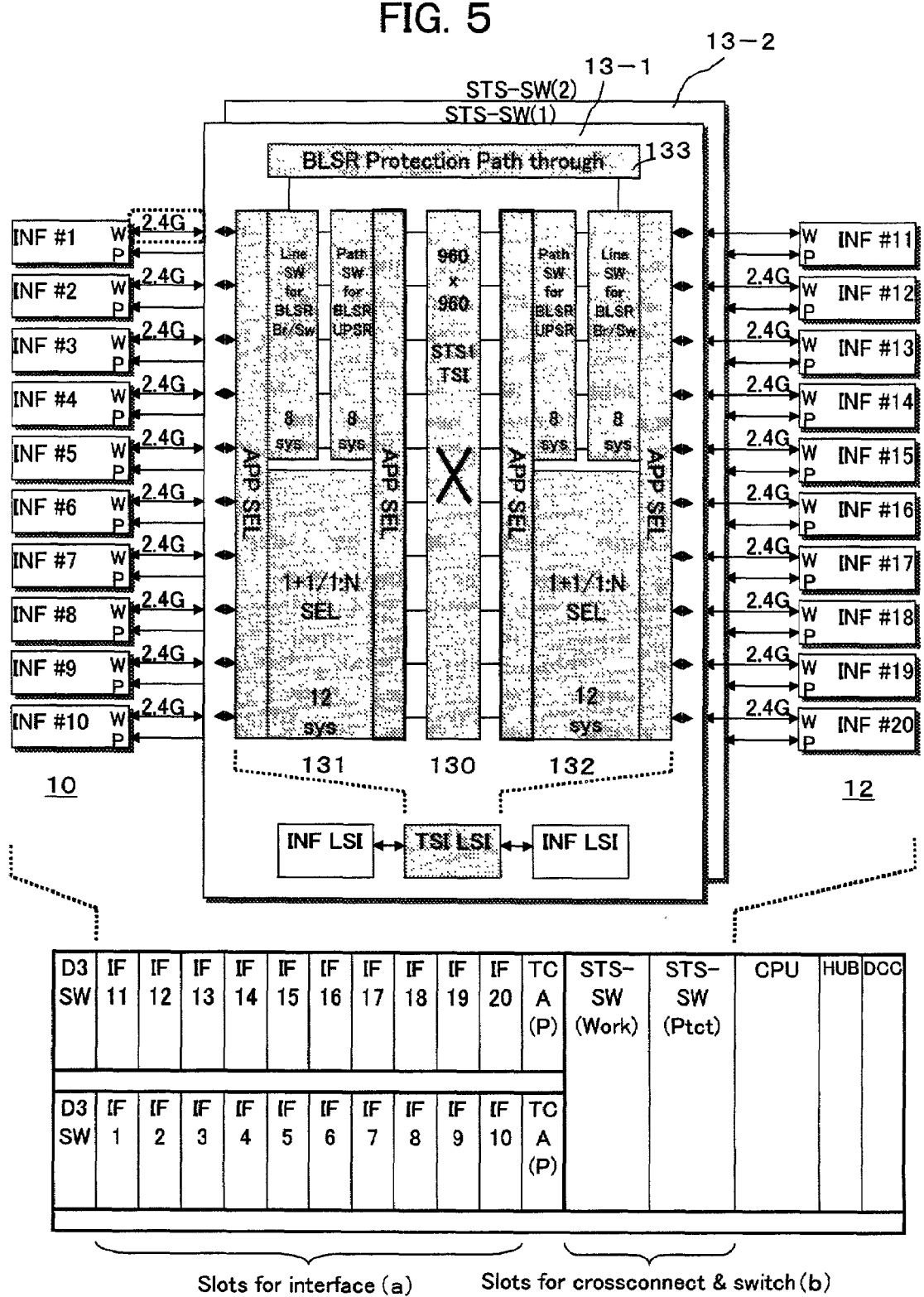
FIG. 5 shows an exemplary implementation of the conventional transmission equipment and an illustration of a mounting method of the service card according to the present invention.

In FIG. 5, there is shown a diagram of an exemplary implementation configuration of existing transmission equipment. An example of mounting service card 14 according to the present invention is shown.

In this example shown in FIG. 5, STS-SW boards 13-1, 13-2 denote a duplicated configuration each functioning as a working unit or a protection unit. Also a plurality of interface boards (#1-#10) 10 and interface boards (#11-#20) 12 have a redundant circuit configuration to be selectively connected to either working or protection STS-SW board 13-1, 13-2.

The configurations inside the duplicated STS-SW boards 13-1, 13-2 are identical, each having a cross-connect portion 130, SONET/SDH system protection switches 131, 132 and BLSR (bidirectional line switched ring) protection path-through 133.

The lower part in FIG. 5 shows a shelf structure for accommodating transmission equipment. The shelf is provided with twenty slots (a) for interface boards; and two slots (b) for STS-SW boards, one for a working side and the other for a protection side.

Further, on the backboard of the transmission equipment, slots (a) for interface boards and slots (b) for STS-SW boards respectively shown in the figure are interconnected. In this example, each backboard interconnects interface boards each having 2.4 G (Gigabit) capacity.

Any channel in interface boards 10, 12 can be connected to a channel in other interface boards through cross-connect portion 130 in STS-SW boards 13-1, 13-2.

When providing a packet switch function according to the present invention in such transmission equipment, it is to be noted that any packet channel must be handled under SONET/SDH system protection domain.

For example, in case of OC-48 BLSR (Bidirectional Line Switched Ring) configuration, when a channel of interest is a packet channel, the channel must be handled so as to be protected under BLSR protection domain like other TDM channels.

Between packet channels, packet switch 22 performs switching and routing on a packet basis (refer to FIG. 4).

This means that a packet must be switched between main signals passing through SONET protection switch in STS- SW boards 13-1, 13-2. Therefore, ideally, packet switch 22 is to be mounted within STS-SW boards 13-1, 13-2.

However, in general, a large number of main signals are concentrated in STS-SW boards 13-1, 13-2 accommodating cross-connect portion 130, producing the unit having high circuit density. This brings about a severe design condition in terms of the number of LSI's, consumption power, and a mounting area.

The transmission equipment shown in FIG. 5 has a capacity of 50 G (960 channels of STS-1). Therefore, although it is ideal to house packet switch function in STS-SW boards 13-1, 13-2, it is very difficult to newly introduce a packet switch circuit thereto. As shown in the lower part of FIG. 5, the slot space is designed for optimally incorporating the inherent transmission function.

Therefore, according to the present invention, service card (packet switch portion) 14 shown in FIG. 4 is allocated at the interface slot (a). In this configuration, packet channels are connected through the cross-connect portion to main signals passing through SONET protection switches 131, 132 in the STS-SW board.

Thus it becomes possible to provide the packet switch function to be overlaid onto SONET network.

Figure 6:
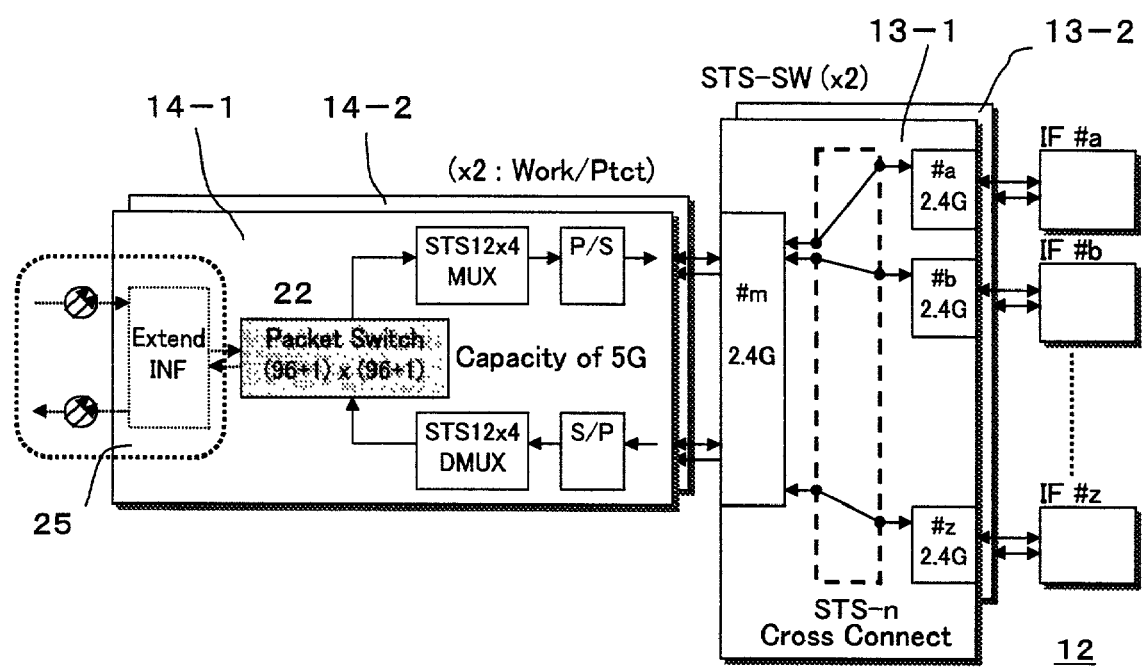
FIG. 6 shows a diagram illustrating a connection between the service card and STS-SW boards 13-1, 13-2 having a duplicated configuration.

In FIG. 6, there is shown the interconnection between service card 14 and the duplicated STS-SW boards 13-1, 13-2.

Corresponding to the duplicated STS-SW boards 13-1, 13-2, service card 14 is required to have a duplicated configuration 14-1, 14-2. The protection is to be carried out in the event of a failure by switching the cards. However, in view of expanding transmission equipment, it is not necessary to prepare in service card 14 a selector for switching the duplicated configuration. As shown in FIG. 6, it is enough to insert service card 14 into interface slot (a) shown in FIG. 5, like other interface boards 12.

Figure 7:
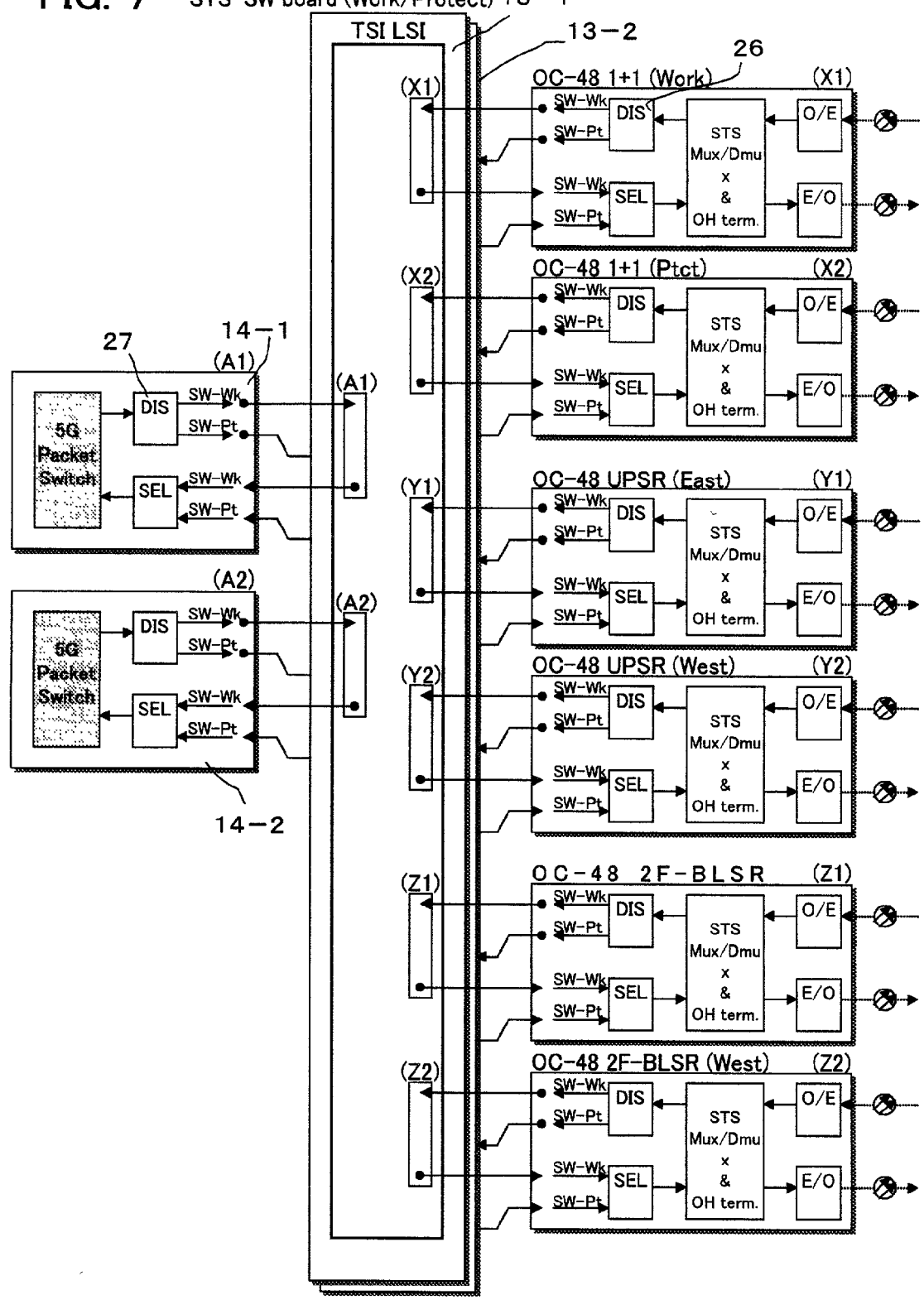
FIG. 7 shows a diagram illustrating an exemplary connection between service cards having a redundant configuration 14-1, 14-2 and STS-SW boards 13-1, 13-2.

In FIG. 7, there is shown a typical connection example between service cards 14-1, 14-2 and STS-SW boards 13-1, 13-2, respectively having redundancy in configuration. In this figure, service cards 14-1, 14-2 having redundant configuration are inserted into slots (A1) and (A2). Meanwhile, interface boards 12 on the line side respectively form OC48 1+1 configuration inserted in slots (X1), (X2), OC48 UPSR (Unidirectional Path Switched Ring) configuration in slots (Y1), (Y2), and OC48 2F-BLSR configuration in slots (Z1), (Z2).

Controlling the redundant configuration is required at two points in packet channel data flow: one is a point of flow from service cards 14-1, 14-2 to STS-SW boards 13-1, 13-2; and the other is a point from STS-SW boards 13-1, 13-2 to interface board 12.

Two slots (A1, A2) in the LSI having cross-connect portion 130 are used for connecting to service cards 14-1, 14-2 so as to enable the redundant configuration in the flow from service cards 14-1, 14-2 to STS-SW boards 13-1, 13-2.

Here, the redundant configuration from STS-SW boards 13-1, 13-2 to interface board 12 does not depend on service cards 14-1, 14-2 because the line protection method employed in SONET network configuration (such as 1+1, UPSR and BLSR) functions to protect in the event of a card failure.

To enable the redundant configuration from STS-SW boards 13-1, 13-2 to interface board 12, in case of 1+1 network configuration, two slots (X1), (X2) being provided in cross-connect portion 130 are used for a working interface board and a protection interface board, respectively. Also, in case of either UPSR or BLSR configuration, two slots (Y1), (Y2) and two slots (Z1), (Z2) being provided in cross-connect portion 130 are used for an east interface board and a west interface board, respectively.

Hereafter a signal flow in each direction related to the above-mentioned redundant configuration are explained.

A signal from each line card in interface board 12 to working/protection STS-SW boards 13-1, 13-2 is made to branch by a branch block 26 in the line card (refer to FIG. 7), to connect to working STS-SW board 13-1 and protection STS-SW board 13-2 through slots (X1, X2), (Y1, Y2) and (Z1, Z2), respectively.

An identical signal is input into each STS-SW board 13-1, 13-2 through both the working line slots and the protection line slots (X1, X2), (Y1, Y2) and (Z1, Z2). Thus switches are configured according to each SONET protection configuration (1+1, UPSR, BLSR, etc.)

Among channels passing through SONET protection switches, packet channels must be connected to service cards 14-1, 14-2. For this purpose, cross-connect portion 130 connects each packet channel to the channel of slots (A1), (A2) being mounted on service cards 14-1, 14-2.

In such a situation, it is necessary to pass an identical signal to both working/protection service cards 14-1, 14-2. For this purpose cross-connect portion 130 performs 1:2 bridge connection, resulting from virtually regarding as OC48 UPSR (Unidirectional Path Switched Ring). This 1:2 bridge connection is identical to the configuration took place in ordinary UPSR.

Figure 8:
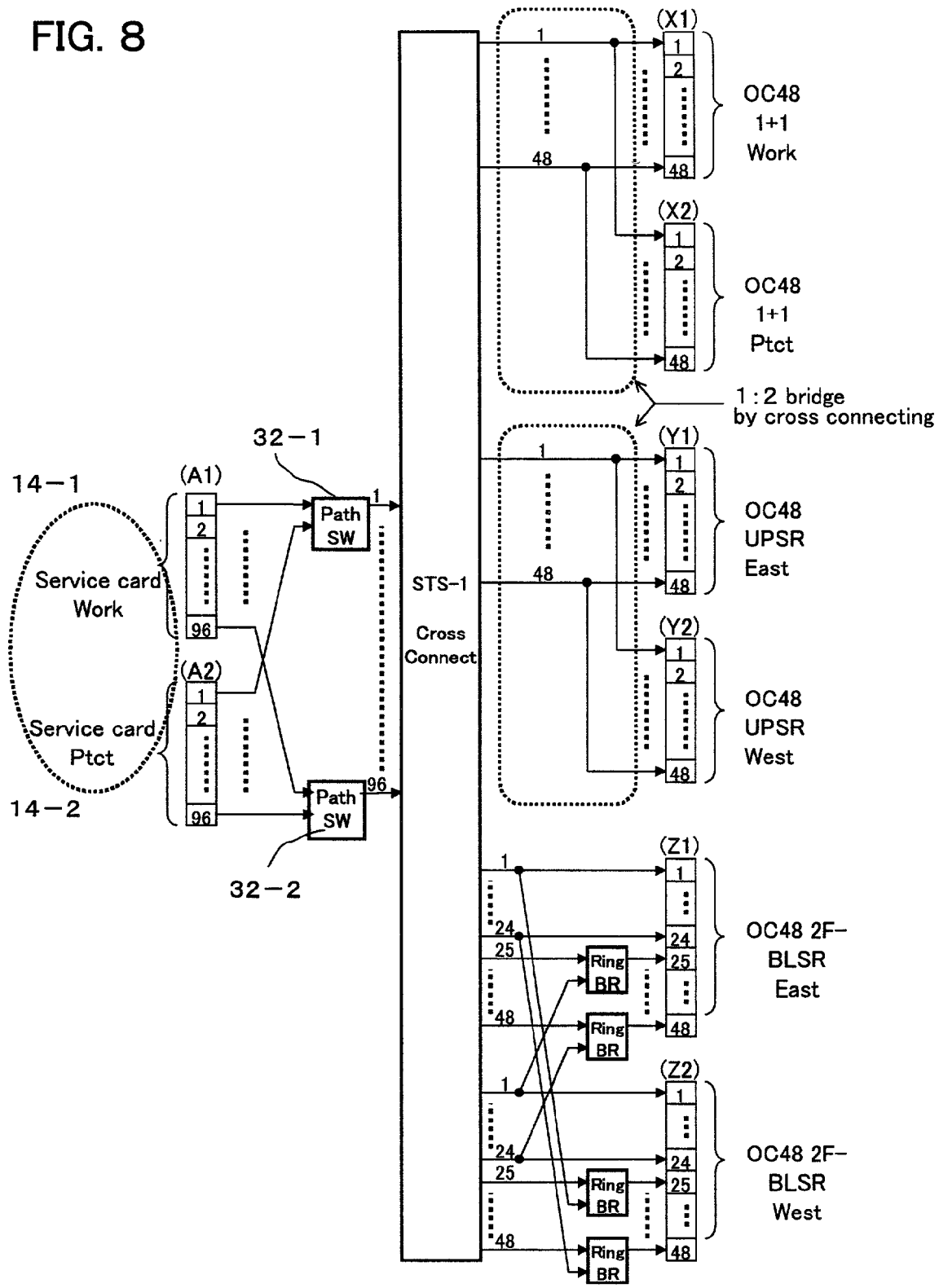
FIG. 8 shows a redundant configuration in the packet flow from working and protection service cards 14-1, 14-2 to line interface board 12.

Now, referring to FIG. 8, a packet flow is explained in the redundant configuration from working/protection service cards 14-1, 14-2 to interface board 12 on the line side.

The signal flow from working/protection service cards 14-1, 14-2 to working/protection STS-SW boards 13-1, 13-2 is similar to a data flow from interface board 12. The signal is made to branch by a branch block 27 (refer to FIG. 7), to connect to working STS-SW board 13-1 and protection STS-SW board 13-2 respectively.

Therefore identical signals are input to each STS-SW board 13-1, 13-2 from a working service card slot (A1) and a protection service card slot (A2). Here, either one of the signals is selected by virtually configured UPSR path switches 32-1 and 32-2.

All channels having signals from service cards 14-1, 14-2 through path switches 32-1, 32-2 are packet channels to be connected to the channels on the line side by cross-connect portion 130.

The signal from STS-SW boards 13-1, 13-2 to interface board 12 on the line side is made to branch according to SONET protection configuration (1+1, UPSR, BLSR, etc.) being configured on a slot-by-slot basis.

As described above, in the data flow from the working/protection slots (A1), (A2) of service cards 14-1, 14-2 to STS-SW boards 13-1, 13-2, it is assumed in cross-connect portion 130 that slots (A1), (A2) housing the service cards of interest perform the function thereof as if UPSR (Unidirectional Path Switched Ring) is configured on the line side, that is, in interface board 12.

Thus, by virtually configuring path switches 32-1, 32-2 between a working channel and a protection channel using existing hardware resources, protection is realized by switching virtual path switches 32-1, 32-2 in the event of a card failure in service cards 14-1, 14-2.

Figure 9:
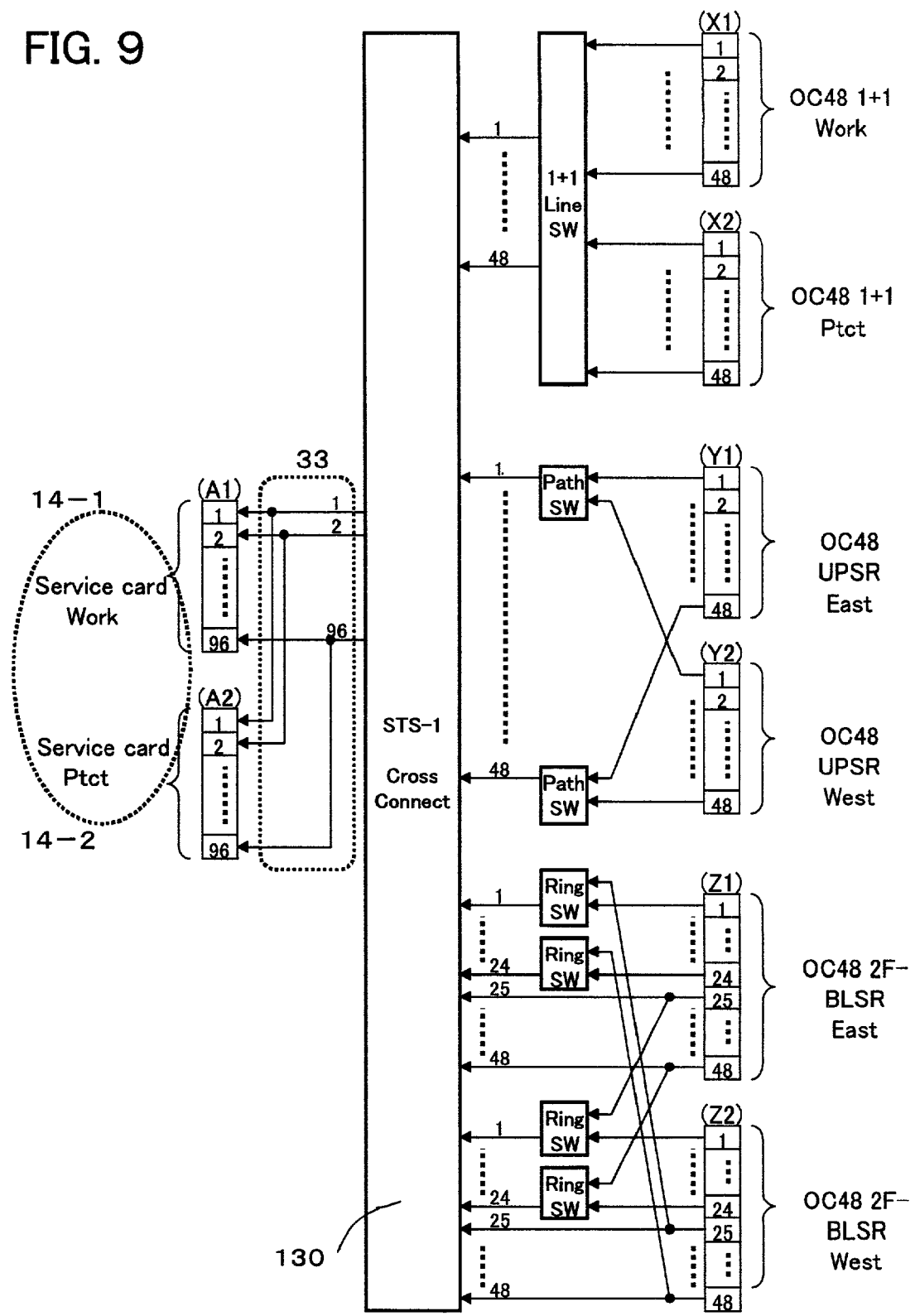
FIG. 9 shows a diagram illustrating a redundant configuration in data flow from a packet channel in interface board 12 to service cards 14-1, 14-2.

Next, referring to FIG. 9, data flow from a packet channel of interface board 12 to service cards 14-1, 14-2 is explained with respect to redundant configuration.

In FIG. 9, redundant configurations are required at two points in data flow from interface board 12 to service cards 14-1, 14-2: one is the point of flow from interface board 12 to STS-SW boards 13-1, 13-2; and the other is the point from STS-SW boards 13-1, 13-2 to service cards 14-1, 14-2.

Here, the redundant configuration from interface board 12 to STS-SW boards 13-1, 13-2 does not depend on service cards 14-1, 14-2 because the line protection method employed in SONET network configuration (such as 1+1, UPSR, BLSR) functions protection also in the event of a card failure.

In the data flow from STS-SW boards 13-1, 13-2, slots (A1), (A2) to the working/protection slots (A1), (A2) of service cards 14-1, 14-2, it is assumed in STS-SW boards 13-1, 13-2 that the slots housing the service cards of interest perform a function as if UPSR (Unidirectional Path Switched Ring) is configured on the line side.

Thus, by configuring 1:2 bridge connection 33 in a working channel and a protection channel using existing hardware resources, an identical signal can be connected to two service cards 14-1, 14-2.

Here, the slots for line interface boards ((a) in FIG. 5) housing service cards 14-1, 14-2 has a predetermined capacity of connection between STS-SW boards 13-1, 13-2.

In the example shown in FIG. 5, the capacity is 2.4 G per slot. Here, it is possible to increase the packet switching capacity twice as much as the capacity in the original configuration, namely 5 G capacity, additionally by using the other slot located in vertical direction, horizontally in the same position, for example, two slots of IF19 and IF9.

However, the capacity expansion using the above method has a disadvantage of requiring a service card of large size. To solve this issue, a method of connecting service cards one another can be introduced using service card extension interface 25 shown in FIG. 4. Substantial packet switching capacity can be increased arbitrarily using this method.

Figure 10:
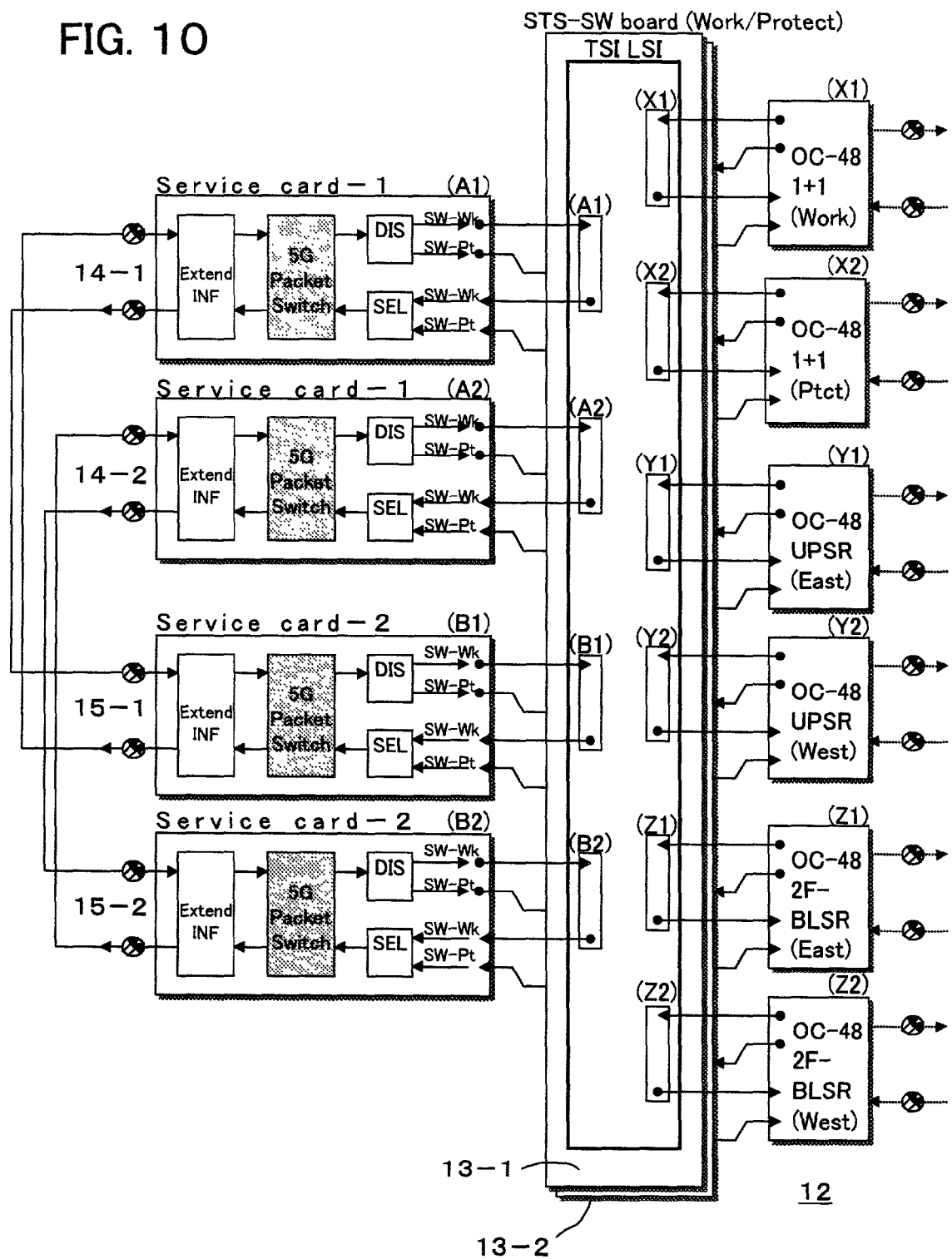
FIG. 10 shows an exemplary configuration of a packet switch having 10 G capacity by employing two sets of 5 G service cards.

In FIG. 10, an exemplary configuration of 10 G packet switch is shown, in which two sets of service cards having 5 G capacity (14-1/14-2, 15-1/15-2) are employed. Also in FIG. 11, a configuration of 15 G packet switch employing three sets of 5 G service cards (14-1/14-2, 15-1/15-2, 16-1/16-2) is shown.

Figure 11:
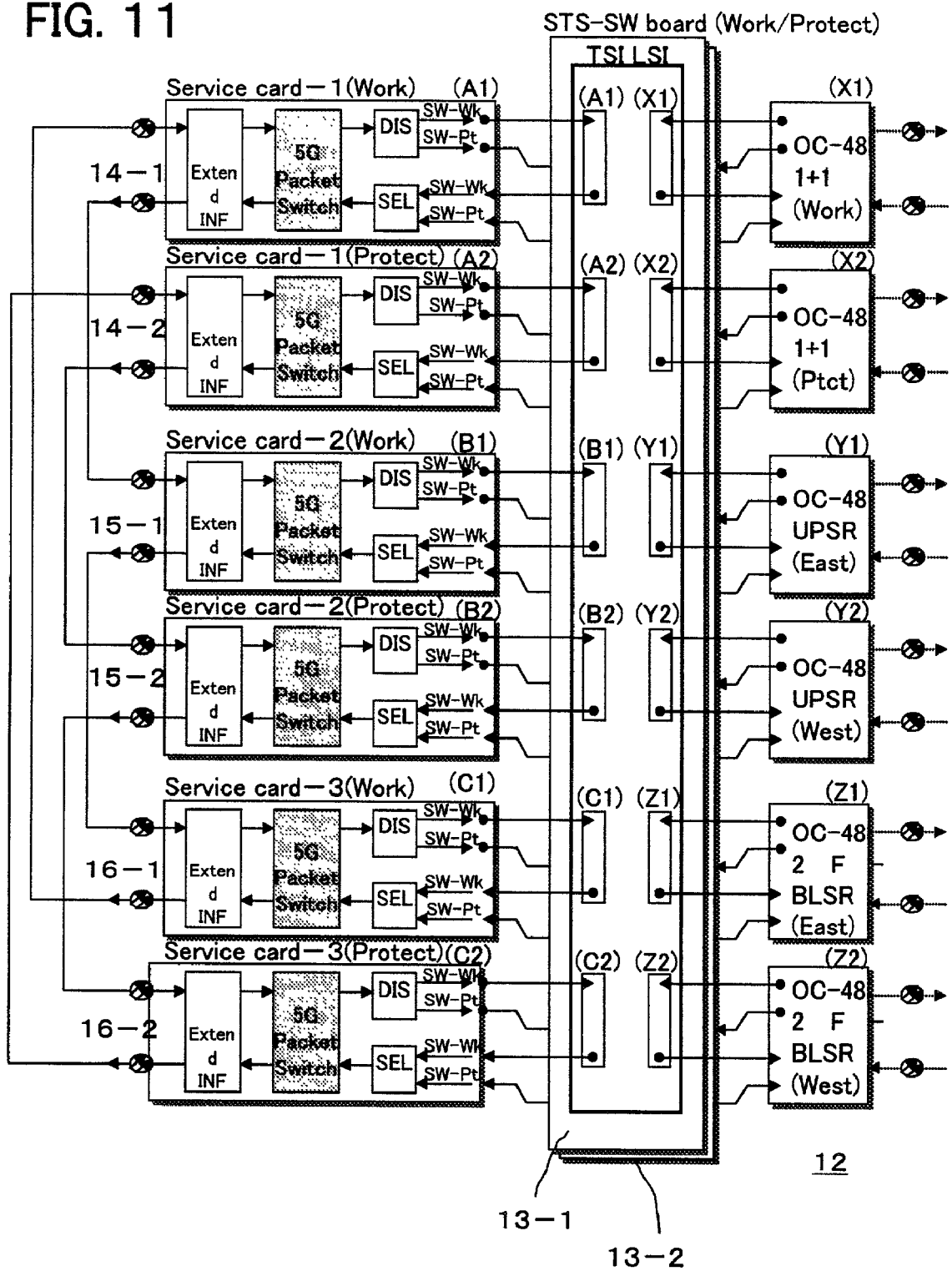
FIG. 11 shows an exemplary configuration of a packet switch having 15 G capacity by employing three sets of 5 G service cards.

On each working/protection side, two service cards in case of FIG. 10, and three service cards in case of FIG. 11, are connected in a ring form.

In the configurations shown in FIGS. 10, 11, a packet channel on the line interface board 12 side is cross-connected to either of the working service cards 14, 15, 16 in STS-SW boards 13-1, 13-2.

In case packet channels are connected to an identical service card, packets are processed so as to switch within the identical service card. On the other hand, in case packet channels are connected to different service cards, packets are transferred directly from one service card to the other through extension interface 25.

For this purpose, a service card has a function of determining whether or not a packet of interest is directed to a channel being connected the card of interest itself. If the packet is directed to the card of interest itself, the packet is switched to the channel concerned. Otherwise, the packet is switched to extension interface 25 to transfer to the service card accommodating the channel concerned.

In case that more than three sets of service cards are connected in a ring form as shown in FIG. 11, an error packet may possibly loop among the service cards. To avoid this looping, the equipment may be provided with a loop avoidance processing using TTL (time to live).

Figure 12:
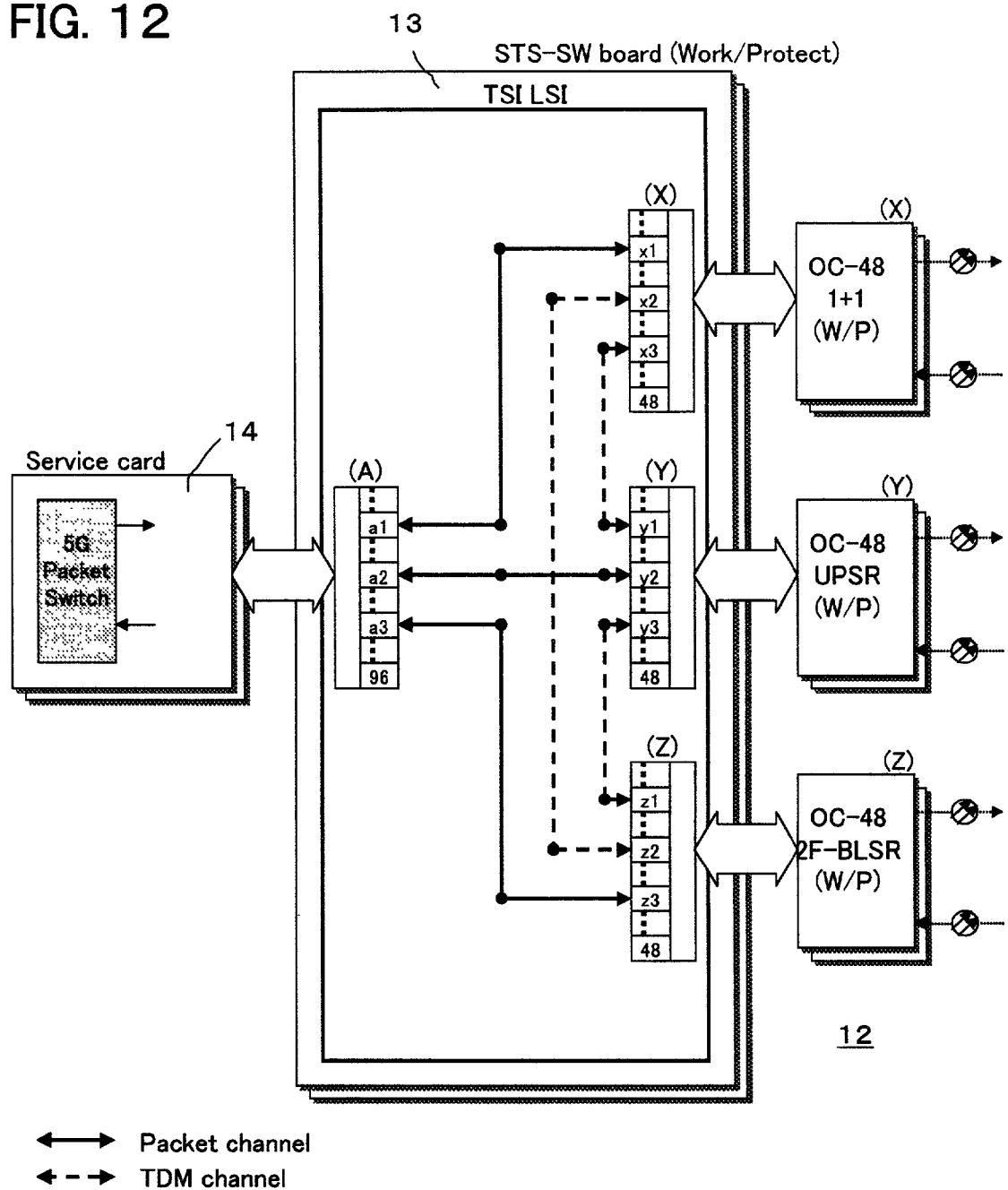
FIG. 12 shows an exemplary cross-connect connection on a channel-by-channel basis in each line card.

In FIG. 12, there is shown an example of cross-connection in each line card on a channel-by-channel basis. In this figure, solid lines denote packet channels, while dotted lines denote TDM channels.

In this example, packet channels of channel x1 in slot (X) having OC-48 1+1 configuration, channel y2 in slot (Y) having UPSR configuration, and channel z3 in slot (Z) having OC-48 2F-BLSR configuration are respectively cross-connected to channels a1, a2, and a3 in slot (A) housing service card 14.

Thus, both TDM cross-connect and packet switch function can be provided using a service card, which functions as a new type of line interface card, without modification of existing transmission equipment including an STS-SW board.

As an embodiment having been described referring to the accompanied drawings, the present invention enables to set packet termination on a channel-by-channel basis for the concurrent provision of channel connection by TDM cross-connect and packet switch processing between packet channels within one transmission equipment unit.

Further, in transmission equipment being already put into service, packet switch function can be added using a service card according to the present invention with upgraded software.

According to the present invention, it becomes possible to provide efficient packet traffic transmission by enhancing the transmission equipment already implemented in a carrier to have the packet processing function, with a reduced number of cross-connects for 1:n (point-to-multipoint) connection between nodes. It is neither necessary to introduce a new router or aggregator, to prepare an additional installation space, or to modify the existing maintenance method.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. Transmission equipment comprising:
    a switch board having a cross-connect portion for making a multiplexed packet signal to branch to predetermined paths;
    a plurality of interface boards having a path on which a multiplexed signal is transmitted and connected to the cross-connect portion; and
    a plurality of dedicated interface boards connected to the cross-connect portion, each having a path switch function, which demultiplexed the transmitted multiplexed packet signal to demultiplexed packets and routes each of the demultiplexed packets to a predetermined path,
    wherein each of the plurality of dedicated interface boards includes an extension interface so that a packet to be directed to a path accommodated in a first of the plurality of dedicated interface boards is routed to a predetermined path in the first dedicated interface board, and that a packet to be directed to a path not accommodated in the first dedicated interface board is routed to another dedicated interface board accommodating the path concerned through the extension interface.

2. The transmission equipment according to claim 1, wherein the switch board ,the plurality of interface boards, and dedicated interface boards are respectively inserted to slots mounted on a shelf frame so as to interconnect mutually through a backboard provided on the shelf frame.

3. The transmission equipment according to claim 1, wherein the packet conforms to either IP (Internet Protocol), ATM (Asynchronous Transfer Mode) or Frame Relay.

4. The transmission equipment according to claim 1, wherein the dedicated interface boards each having the path switch function of routing the demultiplexed packets to a predetermined path is configured to have a working side and a protection side, so that a same demultiplexed packet is transferred to both the working side and the protection side of the dedicated interface board by a 1:2 connection function of a cross-connect portion in the switch board, when a multiplexed signal is transferred from the interface board to die dedicated interface board having the path switch function.

5. The transmission equipment according to claim 4, wherein when a packet signal is transferred from either the working side or protection side of the dedicated interface board to the switch board the packet signal from either the working side or the protection side of the dedicated interface board is connected to the cross-connect portion, by a 2:1 selector in the switch board.

* * * * *